(12) United States Patent
Arai

(10) Patent No.: US 6,813,370 B1
(45) Date of Patent: Nov. 2, 2004

(54) LANE MARKER RECOGNIZING APPARATUS

(75) Inventor: Kazumasa Arai, Mitaka (JP)

(73) Assignee: Fuji Jukogyo Kabushiki Kaisha, Tokyo-to (JP)

( * ) Notice: Subject to any disclaimer, the term of this patent is extended or adjusted under 35 U.S.C. 154(b) by 610 days.

(21) Appl. No.: 09/667,535

(22) Filed: Sep. 22, 2000

(30) Foreign Application Priority Data

Sep. 22, 1999 (JP) .......................................... 11-269578

(51) Int. Cl.[7] .............................................. G06K 9/00
(52) U.S. Cl. .................... 382/104; 340/908.1; 340/919; 340/933; 701/10; 701/117
(58) Field of Search ............................... 382/100, 103, 382/104, 106, 107, 154, 199; 340/901, 902, 903, 904, 905, 906, 907, 908, 438, 439, 938, 939, 988; 701/23, 28, 29, 36, 40, 41, 44, 70, 93, 96, 98, 116, 117, 225; 348/113, 149; 404/12, 93

(56) References Cited

U.S. PATENT DOCUMENTS

| | | | | |
|---|---|---|---|---|
| 5,487,116 | A | * | 1/1996 | Nakano et al. ............. 382/104 |
| 5,708,427 | A | * | 1/1998 | Bush .......................... 340/941 |
| 5,809,161 | A | * | 9/1998 | Auty et al. .................. 382/104 |
| 6,038,496 | A | * | 3/2000 | Dobler et al. ................... 701/3 |
| 6,226,389 | B1 | * | 5/2001 | Lemelson et al. .......... 382/104 |
| 6,396,946 | B1 | * | 5/2002 | Sogawa ...................... 382/154 |
| 6,449,383 | B1 | * | 9/2002 | Oike et al. .................. 382/104 |
| 6,591,000 | B1 | * | 7/2003 | Oike et al. .................. 382/104 |

FOREIGN PATENT DOCUMENTS

| | | |
|---|---|---|
| JP | 5-114099 A | 5/1993 |
| JP | 5-265547 A | 10/1993 |
| JP | 5-347000 | 12/1993 |
| JP | 7-271952 | 10/1995 |
| JP | 8-87700 | 4/1996 |
| JP | 9-325026 | 12/1997 |

OTHER PUBLICATIONS

Taylor C J et al., "A Real-Time Approach to Stereopsis and Lane-Finding", Intelligent Vehicles Symposium, 1996, Proceedings of the 1996 IEEE Tokyo, Japan Sep. 19–20, 1996, pp. 1–6.

Luong Q–T et al., "An Integrated Stereo–Based Approach to Automatic Vehicle Guidance", Computer Vision, 1995, Proceedings., Fifth International Conference on Cambridge, MA, USA Jun. 20–23, 1995, pp. 52–57.

Tsunashima N et al., "Detection of the Front Vehicle from the Stereoscopic Image Using Hierarchy Process", Proceedings of IAPR Workshop on Machine Vision Applications, Nov. 17–19, 1998, pp. 31–33.

Friedrich M. Wahl "Digitale Bildsignalverarbeitung", 1984, Springer–Verlag, pp. 121–129.

Keiji Saneyoshi, et al., "Stereo Image Recognition System for Advanced Safety Vehicle" with partial English–language abstract, (1997), pp. 10–17.

Kazunori Nohsoh, et al., "Simultaneous Estimation of Road Structure and Camera Position from Continuous Road Images", with partial English–language abstract, D–II, vol. J76–D—II, No. 3, pp. 514–523 (1993).

* cited by examiner

Primary Examiner—Bhavesh M. Mehta
Assistant Examiner—Abolfazl Tabatabai
(74) Attorney, Agent, or Firm—Smith, Gambrell & Russell LLP

(57) ABSTRACT

A lane recognition apparatus for recognizing lane markers on a road surface based on a pair of stereo images of a scene in front of an own vehicle obtained from a stereoscopic camera, includes a stereo image processing means for calculating distance information of an image based on the pair of the images, a lane detecting means for detecting a lane marker of a lane in the image based on brightness information of the image and distance information calculated by the stereo image processing means and a lane position recognition means for recognizing a position of the lane marker in real space based on a position of the lane marker detected by the lane detecting means and distance information calculated by the stereo image processing means.

45 Claims, 15 Drawing Sheets

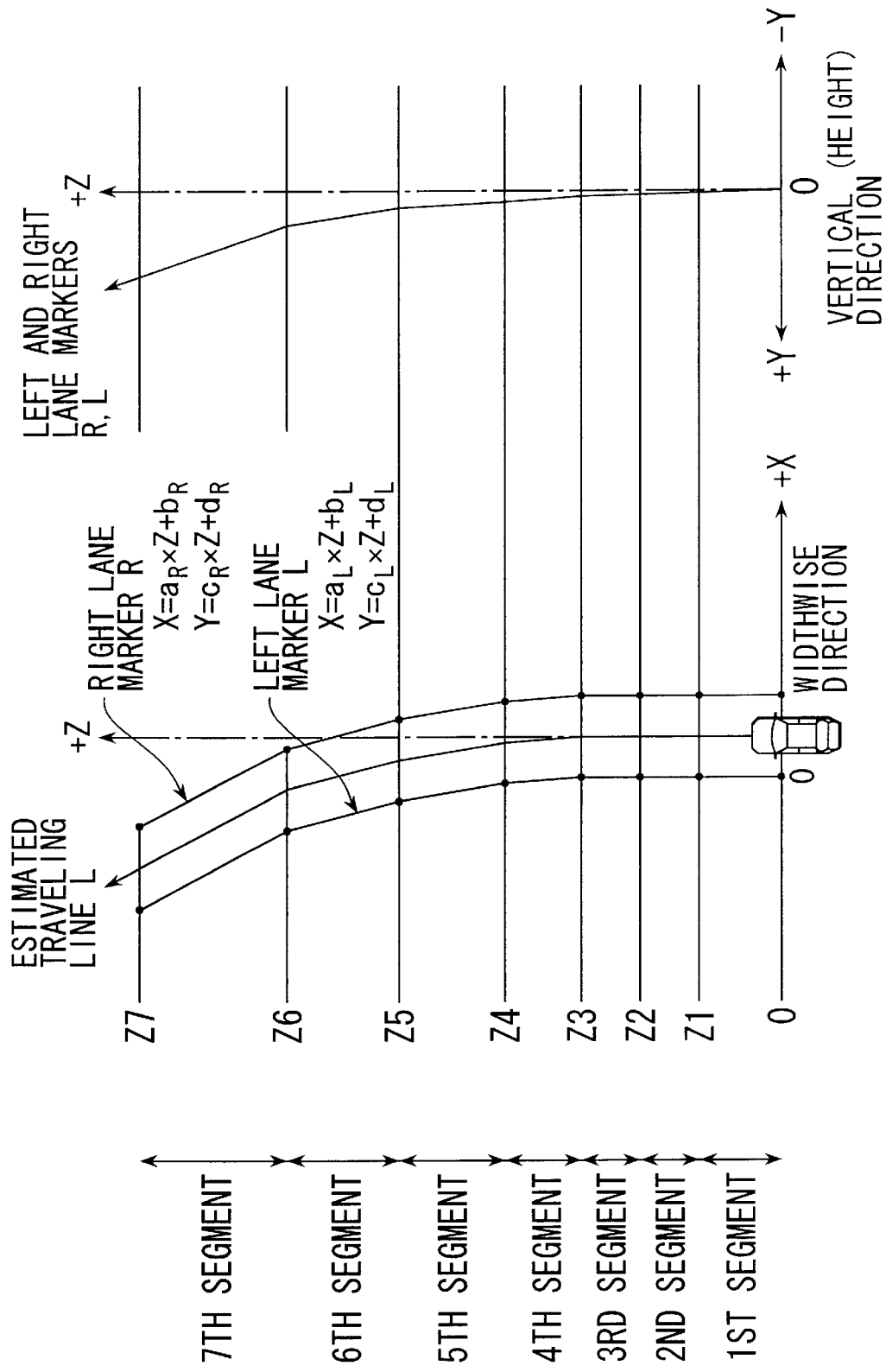

LANE MARKER RECOGNIZING APPARATUS

BACKGROUND OF THE INVENTION

1. Field of the Invention

The present invention relates to an apparatus for recognizing road configurations ahead of an own vehicle by identifying lane markers drawn on road surfaces.

2. Background Art

Recently, people have shown an interest in an apparatus for monitoring vehicle surroundings (hereinafter, referred to as vehicle surroundings monitoring apparatus) for recognizing road configurations in front of an own vehicle using a preview sensor such as monocular camera, stereoscopic camera and the like. In order to recognize the road configuration, it is important to detect lane markers (white markers, no passing lines and the like) drawn on road surfaces. In case where a monocular camera is used as a preview sensor, the detection of lane markers is performed only based on information of two-dimensional picture image, that is, brightness of image. However, the picture image obtained from the monocular camera does not provide distance information to an object. Accordingly, there is a possibility that objects having a brightness characteristic similar to lane markers, such as pillars of preceding vehicles, guardrails and the like, are recognized as lane markers.

On the other hand, in case where a stereoscopic camera is used in place of a monocular camera, it is possible to obtain distance information to objects from a pair of picture images. This is absolutely advantageous over the monocular camera. Japanese Patent Application Laid-open No. Toku-Kai-Hei 5-265547 discloses a technology in which a distance image (distribution characteristic of distance in picture images) is calculated based on a parallax in stereo images and objects (preceding vehicles, road surfaces and the like) are recognized only from the distance image.

In case where the lane markers are recognized only based on the distance image obtained from the stereo images, there is a possibility that objects having the configuration similar to lane markers and the different brightness characteristic are recognized as lane markers, because only rough configurations of objects are obtained from the distance distribution built in the distance image. Such objects, for example, are traces of tire slips, shades, patches and the like.

SUMMARY OF THE INVENTION

It is an object of the present invention to provide a lane recognition apparatus capable of recognizing the position of lane markers in the real space using both of the distance information obtained from a pair of picture images and the brightness information in the picture images. Further, it is another object of the present invention to enhance the reliability of the vehicle surroundings monitoring control by raising the accuracy of recognition of lane markers.

To achieve these objects, a lane recognition apparatus for recognizing lane markers on a road surface based on a pair of stereo images of a scene in front of an own vehicle obtained from a stereoscopic camera, comprises a stereo image processing means for calculating a distance information of an image based on the pair of the images, a lane detecting means for detecting a lane marker of a lane in the image based on a brightness information of the image and the distance information calculated by the stereo image processing means and a lane position recognition means for recognizing a position of the lane marker in real space based on a position of the lane marker detected by the lane detecting means and the distance information calculated by the stereo image processing means.

BRIEF DESCRIPTION OF THE DRAWINGS

FIG. 8 is a diagram of a lane model;

DETAILED DESCRIPTION OF THE PREFERRED EMBODIMENTS

Figure 1:
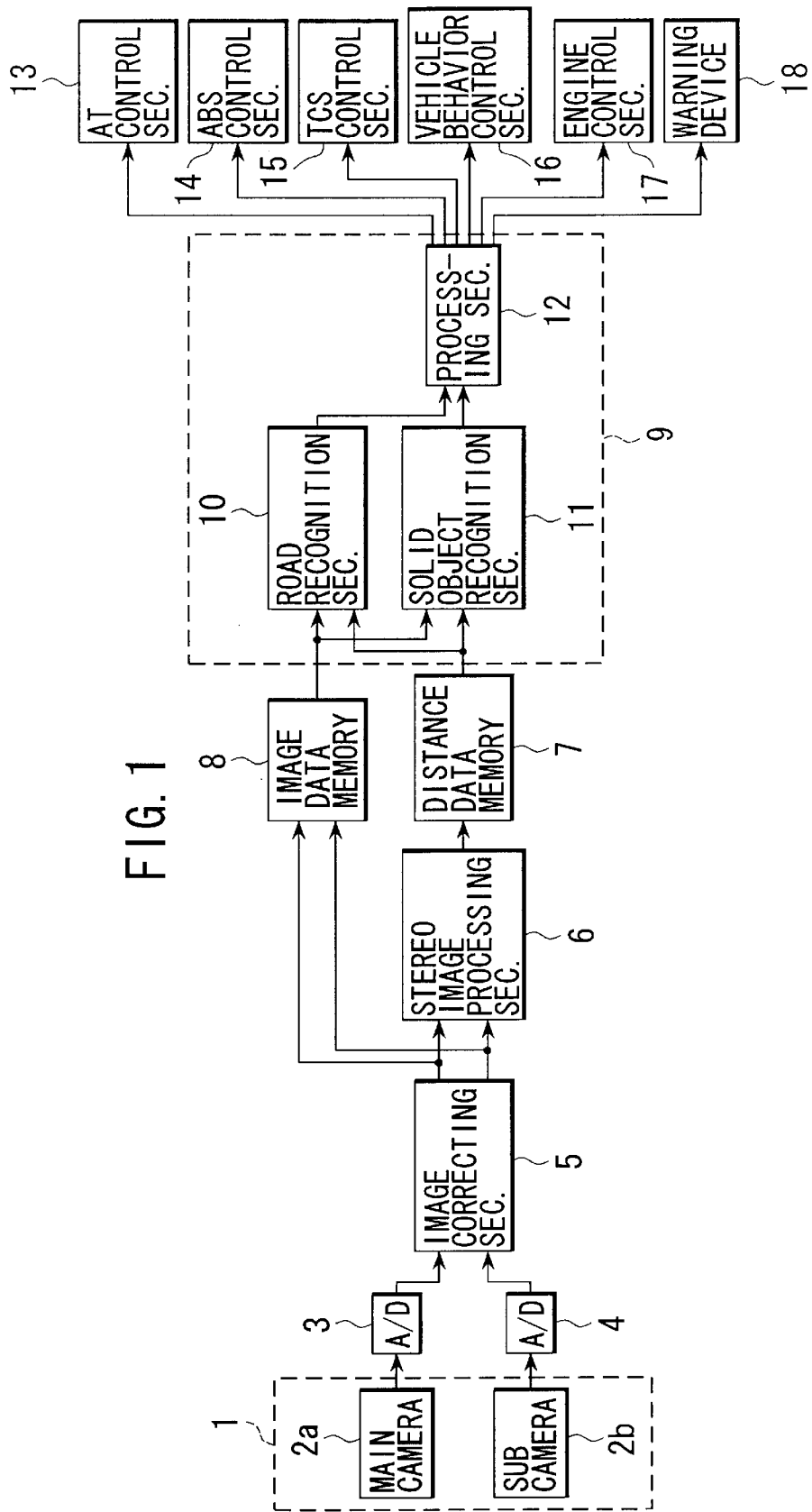
FIG. 1 is a block diagram showing a stereoscopic type vehicle surroundings monitoring apparatus according to the present invention.

Referring now to FIG. 1, numeral 1 denotes a stereoscopic camera for imaging the scenery ahead of an own vehicle. The stereoscopic camera 1 is installed in the vicinity of a room mirror and is constituted by a pair of cameras 2a, 2b incorporating image sensors such as CCD and the like therein. The cameras 2a, 2b are transversely mounted at a specified interval of distance (base line length). The camera 2a (right camera) is referred to as a main-camera for obtaining reference images and is mounted on the right side of the vehicle when viewed from a driver. On the other hand, the camera 2b (left camera) is referred to as a sub-camera for obtaining comparison images and is mounted on the left side of the vehicle when viewed from the driver.

Analogue images outputted from the respective cameras 2a, 2b in a synchronous timing are converted into digital images having a specified number of graduations (for example, 256 graduations in the gray scale) by A/D converters 3, 4. Further, with respect to thus digitalized images, an image correcting section 5 performs a correction of brightness, a geometrical transformation of images and the like.

Through these image processes, reference image data composed of 512 pixels horizontally and 200 pixels vertically are generated from output signals of the main camera 2a and comparison image data having the same vertical length (200 pixels) as the reference image and a horizontal length larger than the reference image (640 pixels) are generated from output signals of the sub camera 21. The reference image data and the comparison image data are stored in an image data memory 8.

A stereo image processing section 6 calculates a parallax based on the reference image data and comparison image data. Since one parallax is calculated for every pixel block composed of 4×4 pixels, maximum 128×50 pieces of parallaxes are calculated for one frame of the reference image. With respect to a certain pixel block (hereinafter, referred to as an object pixel block) in the reference image, an area having a brightness correlation with the object pixel block, that is, a correlation object is searched and identified in the comparison image. Hereinafter, this process is referred to as "stereo matching". As well known, the distance to an object projected in a stereo image is presented as a horizontal deviation amount between the reference image and comparison image. Accordingly, in searching the comparison image, the search may be performed along a horizontal line (epi-polar line) having the same j coordinate value as the object pixel block in the reference image. The stereo image processing section 6 evaluates a correlation with the object pixel block for every pixel block of the comparison image while shifting one pixel by one pixel on the epi-polar line.

The correlation between two pixel blocks can be evaluated by calculating a city block distance CB expressed in Formula 1, for example:

$$CB = |p1ij - p2ij| \quad \text{[Formula 1]}$$

where CB is a city block distance, p1ij is a brightness value of a pixel at the address ij in the reference image and p2ij is a brightness value of a pixel at the address ij in the comparison image. The city block distance CB is a sum of the difference (absolute value) of brightness values p1ij and p2ij over entire pixel blocks. The correlation between both pixel blocks becomes larger as the difference is small.

The city block distance CB is calculated for every pixel block existing on the epipolar line . When the value of city block distance CB is smallest at a certain pair of pixel blocks, the other pixel in the comparison image is judged to be a correlation object of the object pixel block. The deviation amount between the object pixel block and the identified correlation object is a parallax.

Further, the stereo image processing section 6 evaluates an existence or a non-existence of horizontal brightness edges of the pixel block, a relationship between a maximum and minimum values of the city block distance CB calculated on the same epi-polar line and the like. Further, in order to raise the reliability of parallaxes, a filtering process is applied to the parallaxes based on the result of the evaluation. As a result of the filtering process, only parallaxes regarded as effective are outputted. A hardware construction for calculating the city block distance CB and the filtering process are described in detail in the Japanese Patent Application Laid-open No. Toku-Kai-Hei 5-114099. If necessary, the reference should be made to the disclosure. After those processes, the calculated effective parallax are stored in a distance memory 7.

A micro-computer 9 or functionally, a road recognition section 10 recognizes road configurations (lane markers) ahead of the vehicle based on the reference image data (brightness information) stored in the image data memory 8 and the parallaxes stored in the distance memory 7. The road configurations can be identified by recognizing the configurations of left and right lane markers (white markers, no passing lines and the like). The primary feature of the embodiment lies in this lane recognition and more detailed descriptions of the recognition method will be made hereinafter.

A solid object recognition section 11 recognizes solid objects (preceding vehicles and the like) in front of the vehicle. In recognizing road configurations or solid objects, vehicle behavior information from a vehicle speed sensor (not shown) or a steering angle sensor (not shown) or navigation information from a navigation apparatus (not shown) are taken into consideration. Further, a processing section 12 arouses a driver's attention by a warning device 18 such as display, speaker and the like or, if necessary, controls miscellaneous control sections 13 through 17, in case where it is judged based on information from the recognition sections 10 and 11 that a warning is necessary. For example, sometimes an automatic transmission control section 13 is instructed to carry out a shift-down and sometimes an engine control section 17 is instructed to reduce engine power. Other appropriate vehicle controls may be instructed to an anti-lock brake system (ABS) control section 14, a traction control system (TCS) control section 15 or avehicle behavior control section 16 for controlling torque distributions and rotation speeds of respective wheels.

Figure 2:
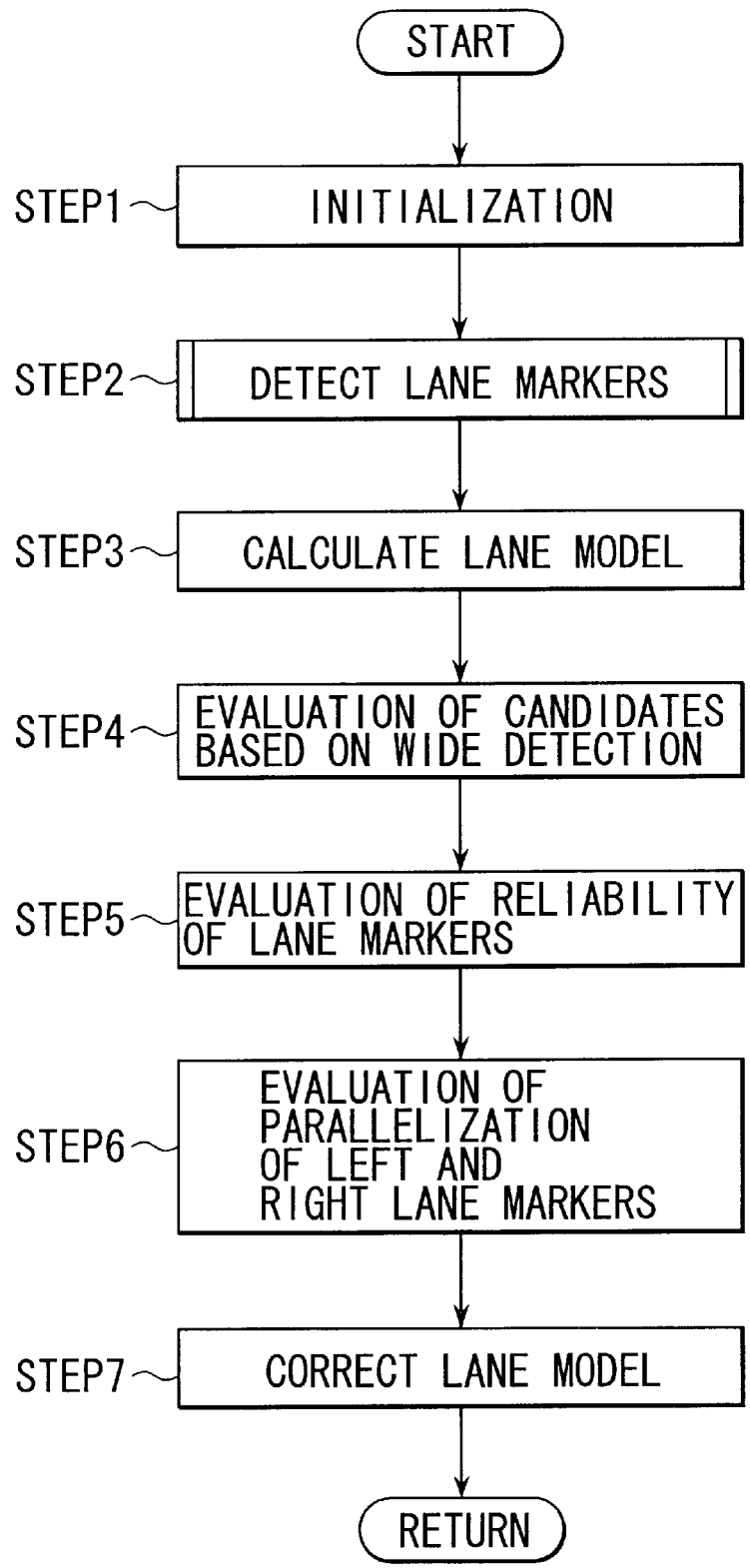
FIG. 2 is a flowchart showing steps for recognizing lane markers according to the present invention.

FIG. 2 is a flowchart showing steps for recognizing lane markers. The road recognition section 10 repeatedly carries out steps shown in this flowchart until one picture image is completed. In this specification, the one picture-full data is referred to as "one frame".

Figure 4:
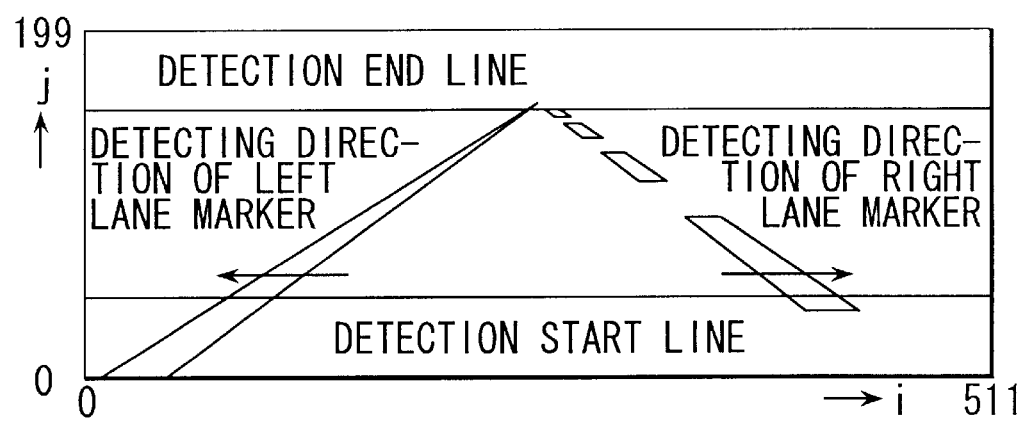
FIG. 4 is a diagram for explaining the direction of detecting of lane markers in an image area.

Before entering the description of respective steps shown in FIG. 2, first steps for completing one frame of the reference image will be described by reference to FIG. 4.

The image in which lane markers are detected is referred to as "reference image" having an area size of 512×200 pixels. In descriptions hereinafter, the reference image is referred to as just "image". The lane detection is performed in the horizontal direction or in the vertical direction for every horizontal line, as illustrated in FIG. 4. A plurality of horizontal lines are established in the reference image from a detection starting line js to a detection ending line je. These starting and ending lines may be established fixedly or may be established variably according to the pitching condition of the own vehicle.

The detection process in the vertical direction is performed from the near side to the far side, namely, from below to above in the image, basically for every horizontal line. In this embodiment, the horizontal line is one pixel wide, however, it may be a plurality of pixels wide. Further, in order to reduce the amount of calculation, the interval of sampling, that is, the interval of the horizontal line may be established to gradually increase as the detection process goes downward of the image. The position of lane marker in an entire image is determined by combining the position of partial lane markers on respective horizontal lines. The reason why the detection in the vertical direction is performed in such an order as going from below to above is that short distance lane markers can be detected relatively easily and include numerous data concerning lane markers. This is advantageous in making a detection process of the next horizontal line based on the position of lane markers already detected in the same frame. Because of this reason, the parallaxes obtained from the stereo image processing section 6 are successively processed in an order from the short distance side (below of image) to the long distance side (above of image)

Further, the detection process in the horizontal direction is performed successively for every one pixel from the center of the image to left and right side, respectively, that is, the detection of left lane markers is performed from right to left and the one of right lane markers is performed from left to right. This is because the inside of left and right lane markers is a road surface whose brightness condition is easy to be estimated and consequently there is a small possibility of detecting lane markers erroneously, compared to the detection in an inverse direction. On the other hand, since normally miscellaneous objects such as gutters and the like are projected on the outside of the lane markers, it is not easy to estimate the brightness condition of all objects likely to exist at that area. Accordingly, if the detection is performed from the outside to inside of lane marker, there is a possibility that the erroneous detection of lane markers often happens and it takes time to perform a detection process.

Thus, the detection process along a horizontal line starts from the inside of lane marker and ends upon the detection of "a lane end point". The term "lane end point" will be described hereinafter.

Referring to a flowchart shown in FIG. 2, at a step 1, first the road recognition section 10 proceeds initializing processes. In this embodiment, the lane recognition is performed in a plurality of segments, respectively. The initializing processes at the step 1 include establishments of a segment for ending the lane detection, an arrangement for indicating what segment the respective horizontal lines belong to, a line for correcting a road height and the like.

Figure 3:
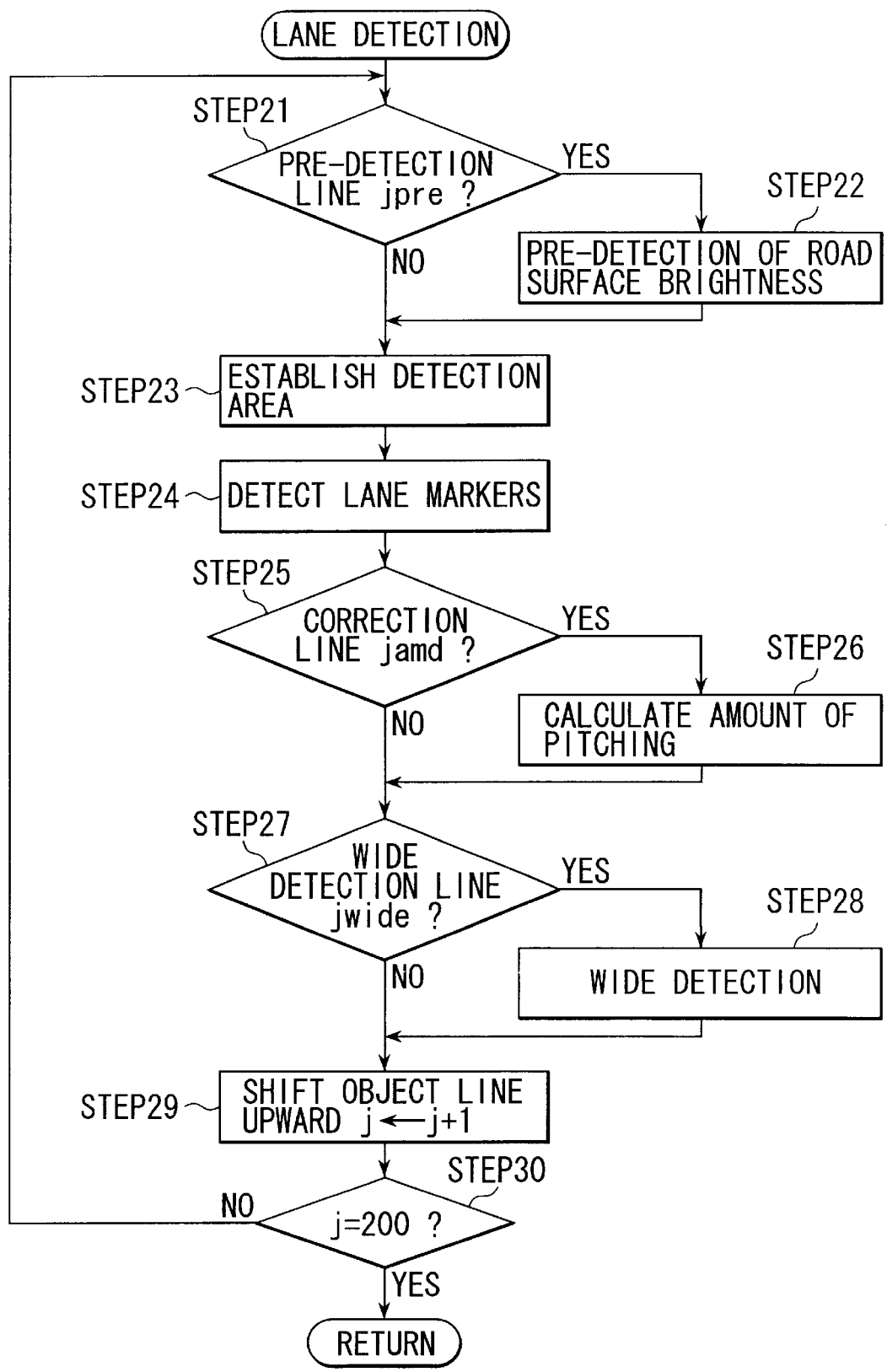
FIG. 3 is a flowchart showing steps for detecting lane markers according to the present invention.

Next, at a step 2, the position of lane markers is detected in an image (reference image) of one frame. Since the lane detection is executed for every horizontal line in order, the position of lane markers is a point on the horizontal line (hereinafter, referred to as "lane point") and the lane point is detected. FIG. 3 is a flowchart showing detailed steps of lane detection processes.

An initial value of a counter j indicating the vertical position of the horizontal line is set to 0. When the counter value j is equal to 200 at a step 29, the routine ends. Since the horizontal line indicated by the counter j is an object of process, the horizontal line is referred to as "object line j".

As described above, the horizontal line on which the lane detection is performed starts with a detection start line js and end with a detection end line je. Accordingly, with respect to horizontal lines below the detection start line js, the lane detection is not performed. Consequently, only the increment of the counter j is carried out at the step 29 until the counter j counts js.

Figure 5:
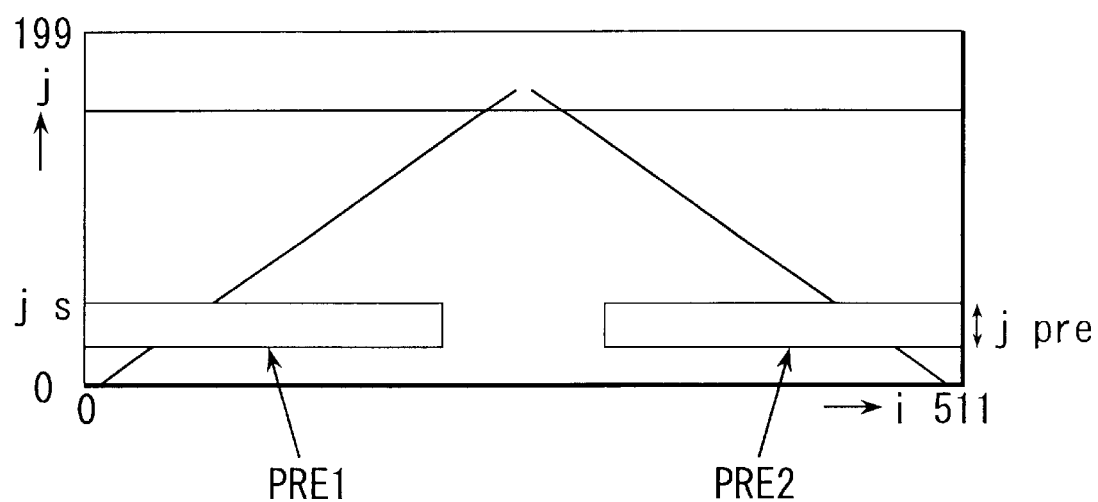
FIG. 5 is a diagram for explaining the range of pre-detecting of lane markers in an image area.

When the increment of the counter j goes on and the object line j becomes a pre horizontal line jpre, the program goes from step 21 to a step 22 as a result of the positive judgment. The pre horizontal line jpre is four consecutive horizontal lines (js−4, js−3, js−2 and js−1) located immediately below the detection start line js. At a step 22, a road surface brightness Aroad is detected before the start of the lane detection. The road surface brightness Aroad is, as shown in FIG. 5, calculated based on brightness within a left pre-detection range PRE1 and a right pre-detection range PRE2 respectively. The pre-detection ranges PRE1, PRE2 are constituted by four pre-horizontal lines jpre and a detection start line is and are established at an area except the central portion of the image. The left and right pre-detection ranges PRE1, PRE2 are fixedly established at an area where the lane markers are likely to be projected under normal driving conditions. Further, a histogram of brightness is calculated in respective detection ranges PRE1, PRE2, letting a brightness value most frequently observed be a road surface brightness Aroad in the respective ranges, namely, in the area of left and right lane markers. The road surface brightness Aroad is used as a base value (base value of threshold value) in judging the left (or right) lane marker at a step 24.

Since a threshold value for judging lane markers is established for each horizontal line, it is necessary to identify the road surface brightness Aroad in the vicinity of the line. Since the road surface brightness Aroad varies according to camera angles or areas on a road surface, in order to raise the accuracy of lane detection, it is preferable to detect the road surface brightness Aroad independently for every object line. Specifically, the road surface brightness Aroad is calculated from five horizontal lines (one object line and four horizontal lines immediately therebelow). Accordingly, in order to detect lane markers of the detection start line js, brightness information of four horizontal lines immediately below the line js (these are not objects of lane detection) is needed. For that reason, in case where it is judged at the step 21 that the object line j is a pre-horizontal line jpre, at a step 22 a road surface brightness Aroad is determined beforehand for the preparation of the lane detection in the detection start line js.

Since the object line j shifts from below to above, the road surface brightness Aroad of the object line j is calculated based on brightness information of respective lines already detected and stored in RAM of the micro-computer 9. Therefore, after the object line reaches a detection start line is, the step 22 is not carried out and thereafter, the detection of road surface brightness Aroad for respective object lines j is performed at a step 24.

When the object line j reaches a detection start line js, the program goes from the step 21 directly to the step 23. At the step 23, a detection area Rj is established on the object linej. The detection area Rj specifies a range of lane detection on the object line j, being established individually for every horizontal line. Three establishment modes are prepared as follows in establishing the detection area Rj. The establishment mode is changed over according to the detecting situation of lane marker in the previous horizontal line. By selecting a most appropriate establishment mode for every horizontal line, it is possible to establish an area as narrow as possible and capable of surely detecting lane markers.

[Establishment mode of Detection Area]

Mode 0: A mode in which the position of lane marker (lane position) on the object line j is estimated based on the detection result of a previous horizontal line in a present frame and the detection area is established on the basis of the estimated lane position.

Mode 1 : A mode in which a narrow detection area is established using the result of recognition (lane position) in a previous frame.

Mode 2: A mode in which a wide detection area is established using the result of recognition (lane position) in a previous frame.

Figure 6:
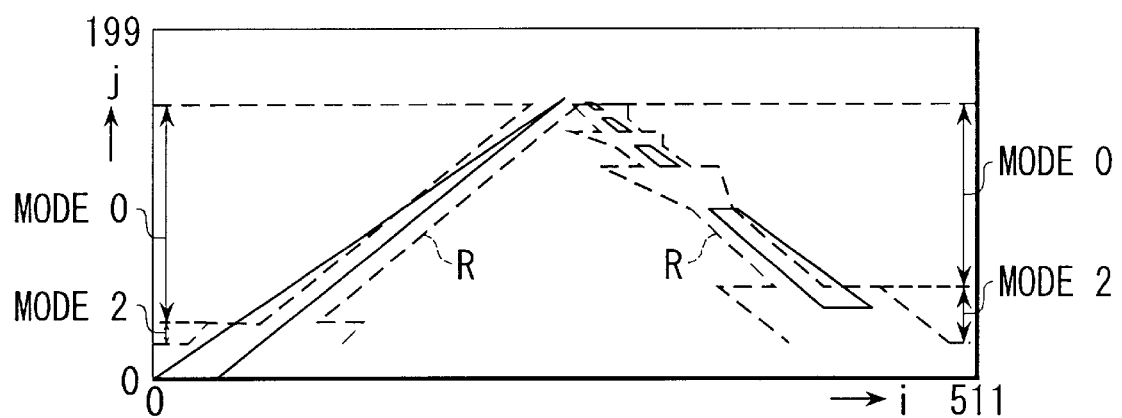
FIG. 6 is a diagram showing a detection area established in accordance with a mode.

FIG. 6 is a diagram showing a detection area R established according to a mode. The mode is set to Mode 2 in the initial condition. Accordingly, a wide detection area Rjs is established on the detection start line js on the basis of a lane position detected in a previous frame. The lane detection is proceeded for each line in Mode 2. From the view point of reducing processing time and raising the accuracy of detection, is necessary to establish an area as narrow as possible. Hence, the size (width) of the detection area Rj of the object line j is regulated based on "reliability of lane markers" detected in the previous frame. That is, as "reliability of lane markers" is high, there is a larger possibility that a lane marker exists in the present frame in the same position as the previous frame. In this case, an allowance being established in consideration of behaviors of the vehicle such as forward and backward movements, pitching movement and the like, a narrow detection area Rj is established based on a lane point P of the previous frame. On the other hand, in case where "reliability of lane markers" is low, if a narrow detection area is established, there is a possibility that a lane marker goes out of the detection area R. Therefore, in this case, it is necessary to establish a wide detection area R.

The reliability of lane markers is calculated at a step 5. The detection area is established based on this calculated reliability of lane markers. The specific method of evaluation of the reliability will be described in detail hereinafter. Describing roughly, the reliability of lane markers are determined taking a continuity of the lane position (position of lane marker) between frames and the number of data of the lane position.

Figure 9:
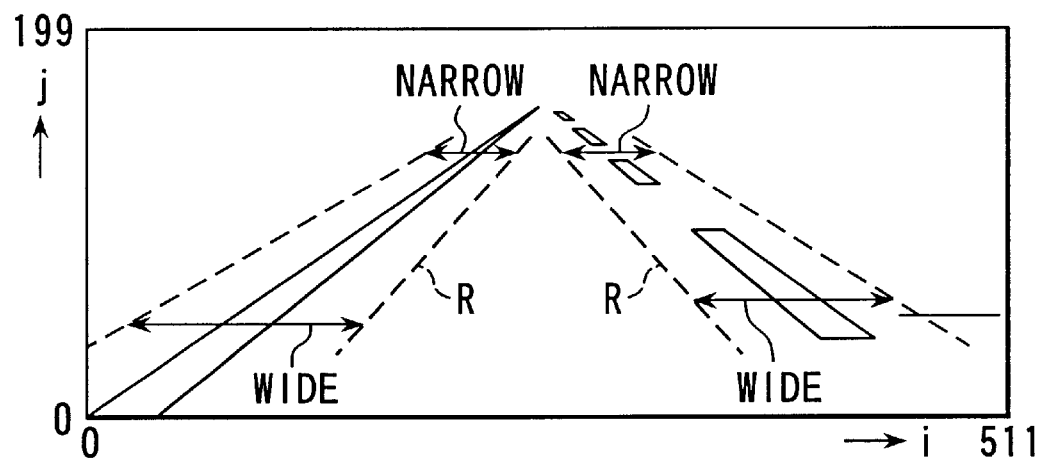
FIG. 9 is an explanatory view of the establishment of a detection area in a mode 2.

Further, as shown in FIG. 9, the width of the detection area Rj on each object line j is established to be smaller as the line j lies high in the image even with the same degree of reliability. The lane in the image becomes narrower as it is far. Hence, the width of the detection area R is established to be smaller as the detection area lies high (far) in the image. It is the same with in Mode 1.

Figure 10:
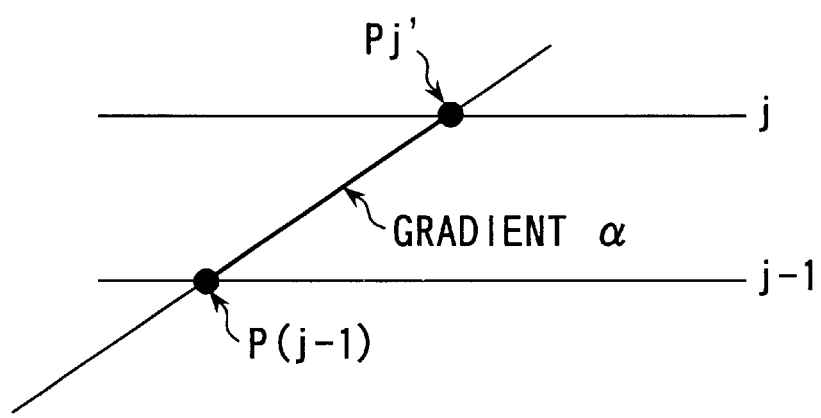
FIG. 10 is an explanatory view of the establishment of a detection area in a mode 0.

First, the detection area R is established in Mode 2 and when the lane marker is detected in a horizontal line lager than a specified number, the mode shifts to Mode 0. In Mode 0, a narrowest detection area R among three modes is established. In this mode, the result of detection before the horizontal line j−1 (line immediately below the object line) is used. FIG. 10 is a diagram for explaining the establishment of the detection area R in Mode 0. First, a lane point P is detected on the horizontal line j−1 and a gradient α of the lane marker on the image plane (i-j plane) is calculated based on the lane marker already detected. When a lane point P (j−1) is detected on a horizontal line adjacent to the object line j, letting a point of intersection of the object line j and a line passing through the lane point P and having a gradient α be a lane point Pj' (temporary lane point), a detection area Rj having a specified width is established on the basis of the temporary lane point Pj' in consideration of curves or detection errors.

Figure 11:
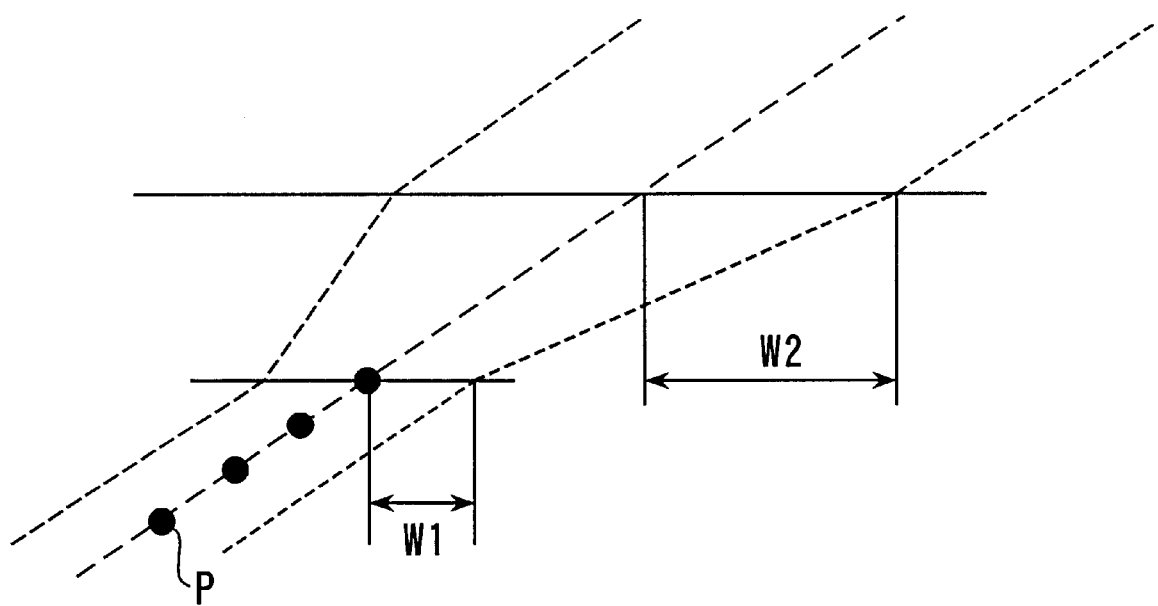
FIG. 11 is a view for explaining the enlargement of a detection area.

Further, under such conditions as a lane marker is broken (for example, a passing line shown in FIG. 6), such conditions as lane markers are stained, or such conditions as a lane marker is curved, horizontal lines on which no lane marker can not detected exist. Such horizontal lines are called "non-detectable line". If such non-detectable lines appear consecutively after a narrow detection area R is established in Mode 0, there is a possibility that the detection area R is established in a position away from actual lane markers. Hence, as shown in FIG. 11, if no lane marker can be detected in an object line j and the number of non-detectable lines exceeds a specified value, the detection area R is gradually enlarged hereinafter. W1 shown in FIG. 11 denotes an allowable minimum width of the detection area R which has been established when the lane point Ps are detected consecutively and W2 denotes an allowable maximum width of the detection area R. If a specified number of non-detectable lines appear consecutively even after the detection area R reaches the allowable maximum width W2, the mode shifts to Mode 1 in which the detection area R is established based on the lane position in the previous frame.

At a step 24, a lane marker is detected within the detection area Rj established on the object line j. Further, a road surface brightness Aroad with respect to the object line j is also calculated at the step 24. If necessary, information calculated at the step 22 (pre-detection of road surface brightness) is used. The lane detection method according to this embodiment is characterized in using distance information of the image calculated in the stereo image processing section 6 besides brightness information (brightness value and differential of brightness) of the image itself. Thus, in detecting the lane position in the image the use of distance information can enhance the accuracy of detection compared to the method only based on brightness information. The lane point P (i, j) detected for each horizontal line is stored in a nemory constituting the micro-computer 9.

Figure 7A:
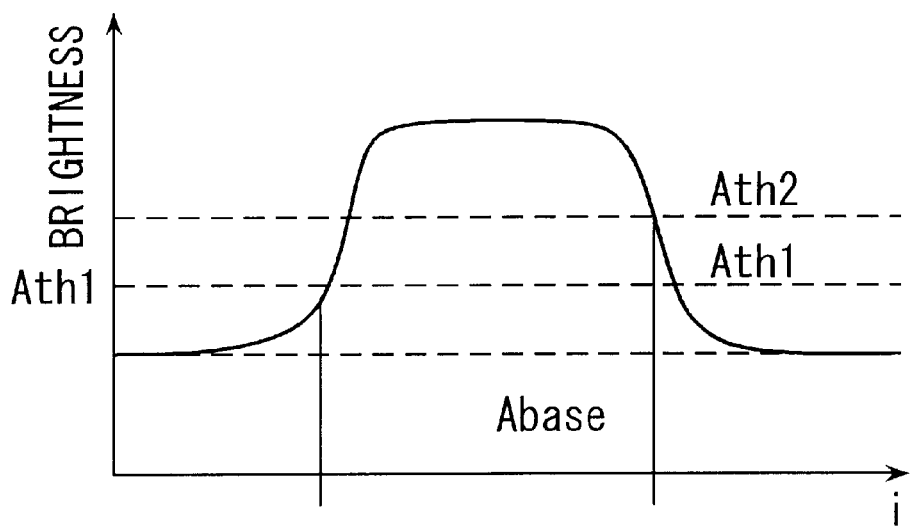
FIG. 7 is a diagram showing a brightness characteristic of a horizontal line in which a lane marker exists.

FIG. 7 is diagram showing brightness characteristics of a horizontal line containing a lane marker. As understood from this characteristic diagram, a horizontal line where a lane marker exists, has following brightness characteristics:

- there is a strong edge intensity at the boarder of lane marker and asphalt surface(see FIG. 7b).
- there is a high brightness portion larger than brightness of road surfaces (see FIG. 7a).
- there is a high brightness portion equivalent to the width (more than 10 centimeters)of an actual lane marker (see FIG. 7a).

Further, the horizontal line in which a lane marker exists, has following distance characteristics:

- distance (parallax) is calculated at the boarder (edge section) of a lane marker and asphalt surface
- an approximately constant distance is calculated.

In this embodiment, a candidate of lane marker is extracted based on brightness information of the image (brightness data stored in the image data memory 8). However, at this stage, it is not certain that the extracted candidate of lane marker is on a road. Here, in order to raise the accuracy of lane detection, it is judged based on distance information (parallax stored in the distance data memory 7) whether or not the candidate is on a road.

First, the extraction of a lane candidate (hereinafter, referred to just as "lane") will be described.

Figure 7B:
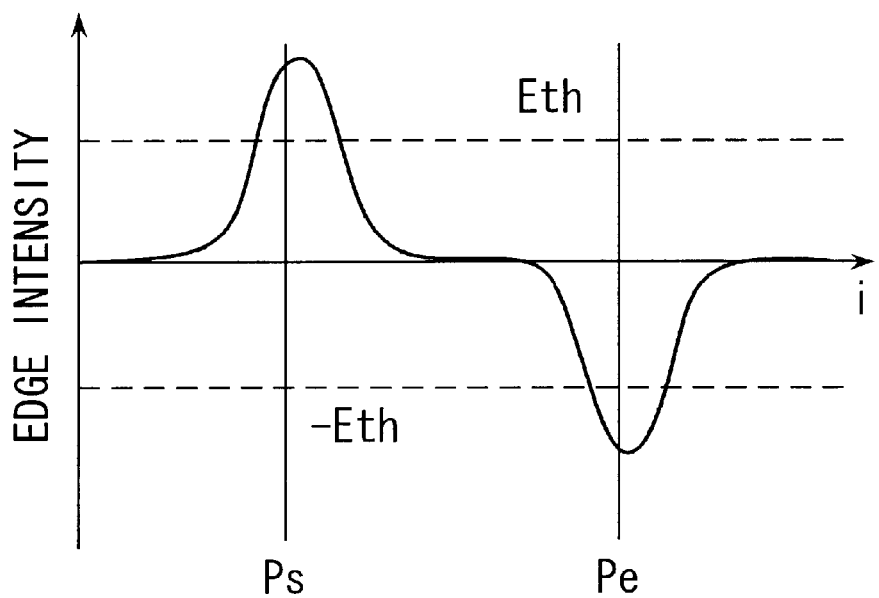

Referring to FIG. 7a and 7b, lane points P (start point Ps and end point Pe) are found based on the aforesaid brightness characteristic according to the following conditions. Here, the start point Ps denotes a lane point at an inside boarder of a lane marker and an asphalt surface and the end point Pe denotes a lane point at an outside boarder of a lane marker and an asphalt surface.

Conditions of Start Point Ps

1. The edge intensity (differential of brightness) is larger than a positive threshold value Eth.
2. Brightness is larger than a threshold value Ath1 for judging a start point brightness.

Conditions of end Point Pe

3. The edge intensity (differential of brightness) is smaller than a negative threshold value −Eth.

Mutual Conditions of Start Point Ps and end point Pe

4. The interval between the start point Ps and the end point Pe is within a specified range (equivalent to the width of lane marker).
5. An average of brightness values Aave within a range from the start point Ps to the end point Pe is larger than a threshold value Ath2 for judging brightness of lane marker (Ath1 <Ath2)

With respect to the condition 5, since the width of lane marker projected on the image differs according to a vertical position (j coordinate) of the horizontal line, the aforesaid specified range is established in consideration of the width of lane marker which will be actually projected on the image.

Further, the threshold values Ath1, Ath2 are calculated based on the road surface brightness Aroad. That is, the threshold values Ath1, Ath2 are calculated by adding constants α, β (0<α<β) to the road surface brightness Aroad, respectively. The calculation of the road surface brightness Aroad at the step 24 slightly differs from the calculation of the road surface brightness at the step 22 in the method of establishing the detection range R. At the step 22, the road surface brightness Aroad is calculated from the brightness over the entire areas of the pre-detection ranges PRE1, PRE2 as shown in FIG. 5. On the other hand, at the step 24, the sampling area of brightness is established in the pre-detection ranges PRE1, PRE2 excepting the outside of the lane. The reason why the sampling area is established so as not to include the outside of the lane is to prevent an inappropriate road surface brightness Aroad from being calculated due to objects outside of the lane. In this state, since the lane point Pj is not yet identified on the object line j, the center point (I, j) of the detection area Rj is regarded as the lane point Pj. Further, in the same way as the step 22, a histogram of brightness of pixels in the sampling area is calculated, letting the brightness value most frequently observed be a road surface brightness Aroad.

When brightness of pixels is referred to on the object line j in a detection order (leftward for the left lane marker and rightward for the right lane marker), if a point satisfying both of the aforesaid conditions 1, 2 is found, this is a start point Ps. Further, if a point satisfying the condition 3 is found, that is an end point Pe. Then, it is judged whether or not the interval between the start point Ps satisfies the condition 4 and the average brightness value Aave satisfies the condition 5.

Figure 12:
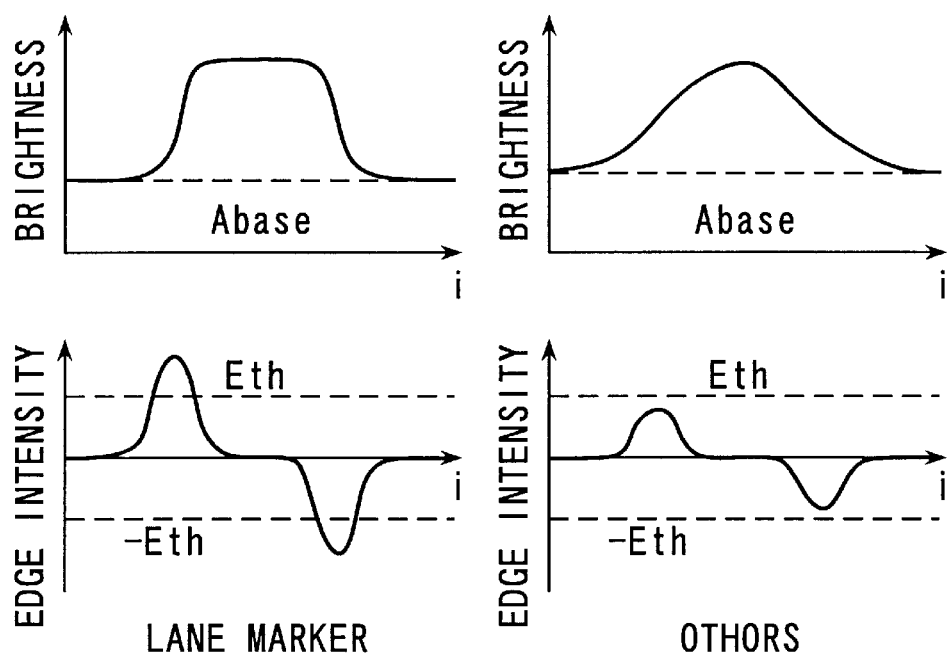
FIG. 12 is a diagram showing a difference of brightness characteristic according to a difference of objects on a road surface.

FIG. 12 is a diagram showing a difference of the brightness characteristic between a lane marker and others else(for example, stains and the like). As understood from the drawing, in case where objects other than lane markers exist on the road surface, the boarder of those and asphalt surface is mostly indistinct. Also, there is a tendency that the edge intensity of those objects has lower peaks than that of lane markers. From this point of view, if an appropriate threshold value Eth is selected, it is possible to clearly discriminate lane markers from other objects.

Further, in this embodiment, as shown in FIG. 7, two threshold values Ath1, Ath2 (Ath1<Ath2) are established in order to raise the accuracy of lane detection. As understood from the relationship between brightness characteristic and edge intensity as shown in FIG. 7, the brightness when the edge intensity forms a positive peak is fairly smaller than the maximum brightness value. In order to detect the start point Ps properly, it is necessary to establish the threshold value Ath1 for judging a start point brightness to be relatively low. However, if the threshold value Ath1 is applied uniformly, that is, the threshold value Ath1 is used also for the threshold value Ath2 for judging brightness of lane markers, there is a possibility that objects other than lane markers are detected as lane markers. For that reason, the threshold value Ath1 for judging the brightness at the detection of edge is established separately from the threshold value Ath2 for judging the brightness condition over the entire lane marker.

Figure 13:
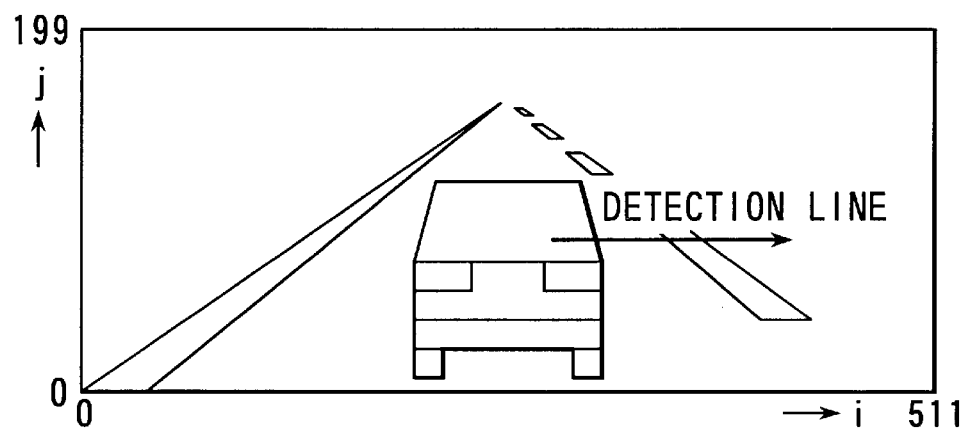
FIG. 13 is a diagram showing an image in which a preceding vehicle is projected.
Figure 14A:
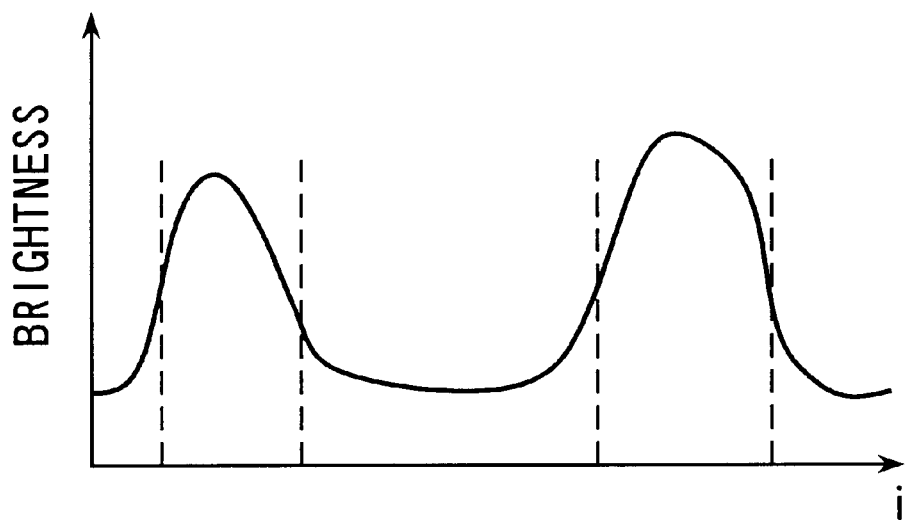
FIG. 14 is a diagram showing a relationship between brightness and distance in the image illustrated in FIG. 13.
Figure 14B:
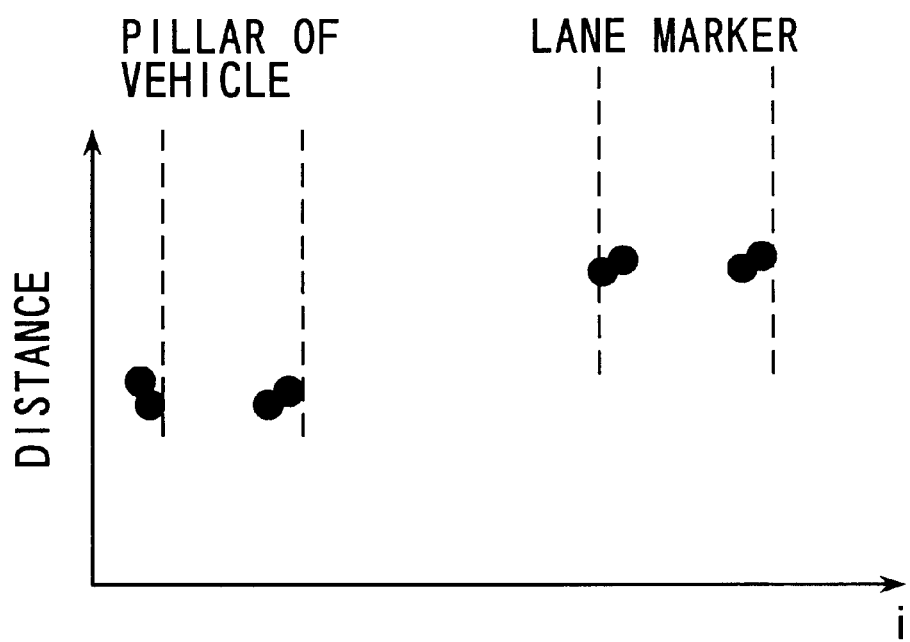

A point satisfying these conditions on the object line j is a lane point Pj. It is not certain whether or not the lane point Pj exists on the road. Hence, in order to raise the accuracy of the result of detection, it is verified whether or not the lane point Pj obtained from brightness information exists on the road. For example, a picture image as shown in FIG. 13 being considered, the picture image shows a brightness characteristic as shown in FIG. 14a depending upon colors, structures, direction of a vehicle traveling ahead of an own vehicle. In this case, since the detection is dependent only upon brightness information, there is fear that a pillar on the preceding vehicle is detected as a lane marker. In this case, if distance information is concurrently used, as shown in FIG. 14b, since there is a clear difference between a distance to the pillar of the preceding vehicle and that to the lane marker on the road, the verification by distance information enables to detect only lane marker. Respective lane points P (i, j) thus obtained from both brightness and distance information are stored in RAM of the micro-computer 9.

Figure 15:
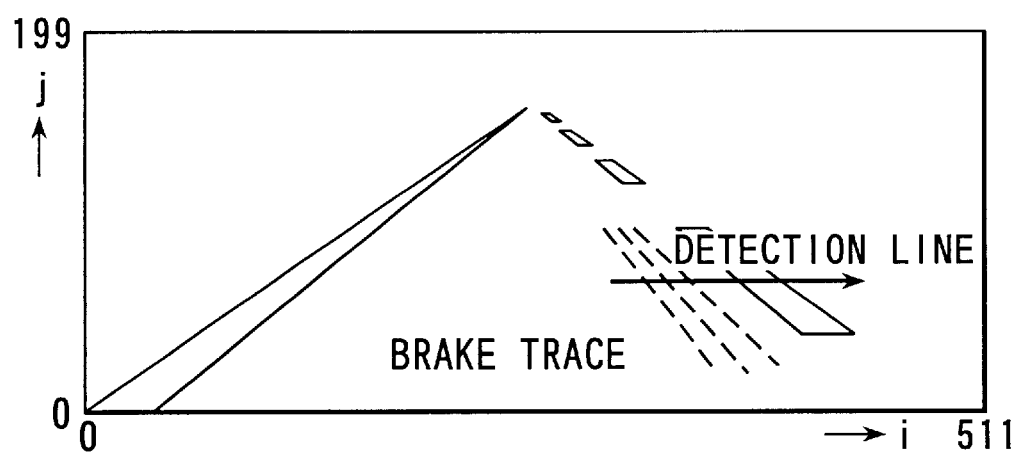
FIG. 15 is a diagram showing an image in which a trace by braking is projected.
Figure 16A:
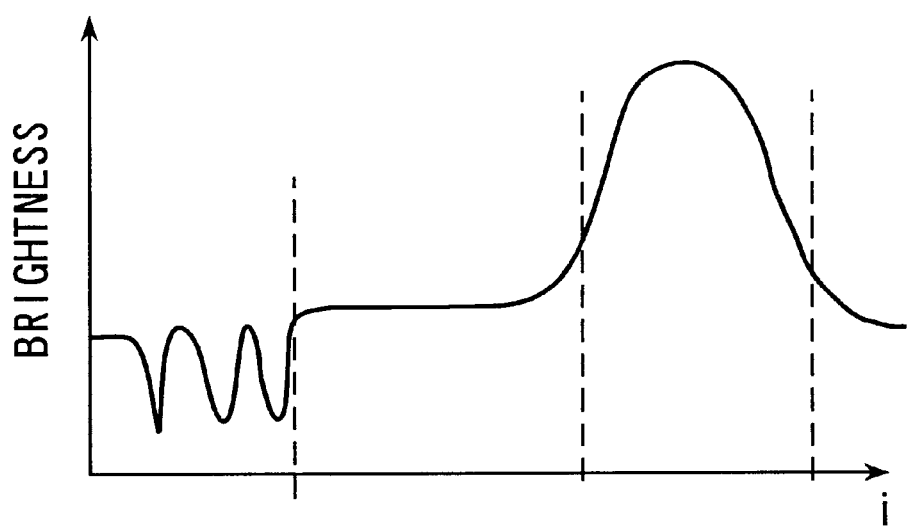
FIG. 16 is a diagram showing a relationship between brightness and distance in the image illustrated in FIG. 15.
Figure 16B:
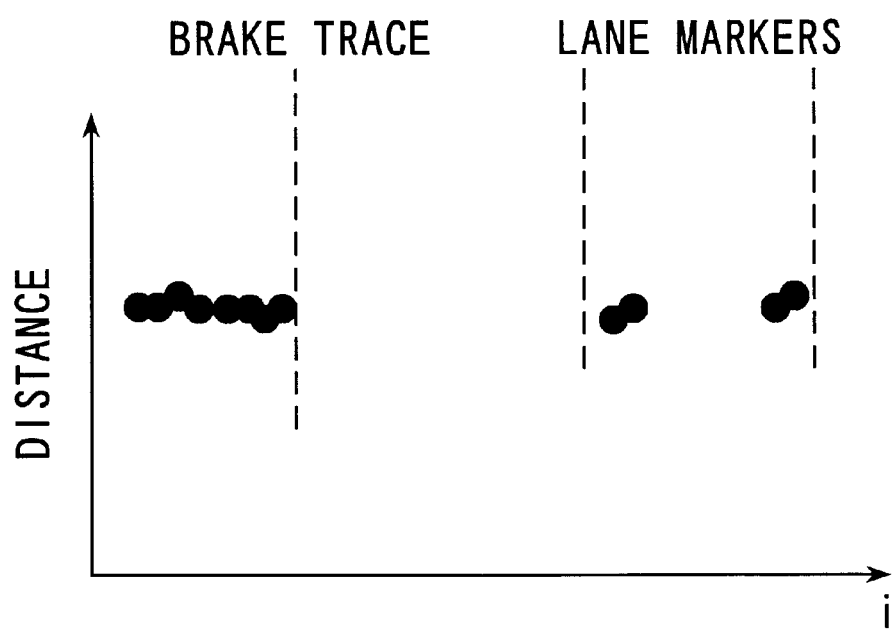
Figure 17:
FIG. 17 is an explanatory view of a method of calculating a pitching motion of an own vehicle.

According to the lane detection method described above, first a lane marker is detected form brightness information and then the result of detection is verified based on distance information. Alternatively, first objects on the road are extracted by processing distance information and then a lane marker may be identified based on brightness information. For example, a picture image as illustrated in FIG. 15 being considered, in case such a picture image, distance (parallax) to portions such as a brake trace and a lane marker is calculated. Therefore, even when there are objects other than the road surface, those objects can be deleted by use of distance information. Further, when brightness information is processed in the vicinity of the position where the distance is detected, only the lane marker can be extracted by judging the difference of brightness characteristic between lane markers and brake traces as shown in FIG. 16a.

In case where the object line j is a correction line jamd, the program goes from the step 25 to a step 26. The correction line jamd denotes a group of horizontal lines from ja to jb (jb≦ja) established beforehand in a relatively low part of the image. At the step 26, a pitching amount of the own vehicle is calculated based on respective lane points P detected on respective correction lines jamd and a parallax d at a lane point P. The parallax d is a parallax calculated for pixel blocks including the lane points P and is stored in the distance data memory 7.

The detection of the pitching condition is important in raising the accuracy of recognition not only of a road (lane markers) but also of an object (preceding vehicle). In this embodiment, in order to discriminate a preceding vehicle from an object on the road, for example a small sink of the road surface, paint and the like, a road height model is used. That is, in case where an object exists on a higher side than the road surface specified by the road height model, that object can be regarded as a preceding vehicle.

However, when the recognition process of solid objects is started using the road height model calculated this time, actually there are restrictions such as processing time, hardware ability and the like. Accordingly, these processes can not proceeded in parallel and in the present recognition of solid objects, a road height model calculated previously is used. Hence, when a pitching motion of the own vehicle occurs, the height of the road seen from the stereoscopic camera 1 changes and as a result a deviation is caused between the height of the road of the camera and the height of the road calculated by the road height model. Due to this deviation, there is a possibility that a solid object is erroneously recognized. For that reason, at the step 26, the pitching condition of the own vehicle is detected before calculating the lane model at the step 3.

Specifically, the amount of pitching is calculated as follows. First, at a step 24, respective lane points P(i, j) in the horizontal line group Jamd (correction line) are detected. The respective points P(i, j) indicate the position of a lane marker on a relatively lower side of the image, that is, a lane marker located in a sort distance (distance up to around 20 meters) The road height in the present frame is calculated based on the lane points P thus sampled.

Next, the parallax d with respect to the respective lane points P is calculated. The parallax d of the respective lane points P is a parallax calculated with respect to a pixel block including the lane point P and stored in the distance data memory 7. Thus, coordinates (i, j) of the respective lane points P and a parallax d are identified as a set of coordinates (i, j, d). A set of coordinates (X, Y, Z) of a lane point P in real space can be unconditionally identified from the set of coordinates (i, j, d) thus obtained. X denotes a position in a widthwise direction of the vehicle, Y denotes a position in a vertical (height) direction of the vehicle and Z denotes a position in a longitudinal direction of the vehicle, that is, a distance. A specific way of coordinate transformation from (i, j, d) to (X, Y, Z) will be described at a step 3.

Thus obtained lane points P are plotted on a Y-Z (Y: height, Z: distance) plane and an approximation line L' is calculated by applying the least square method to the plotted lane points P. Further, a gradient a of the approximation line L' is calculated with respect to the road height model (road height L in a specified distance from the own vehicle) calculated in the previous frame. The pitching amount can be estimated from the gradient α. If the gradient α is positive, it means that the own vehicle is directed downward. As the absolute value of the gradient α is large, the pitching amount increases.

The road height model calculated in the previous frame is corrected by thus calculated gradient α. The corrected road height model is used for calculating a road surface in the solid object recognition. Since the effect of pitching is reduced when the present solid object recognition is performed based on the corrected road height model, the accuracy of recognition can be raised.

Further, a roll angle of the own vehicle or a bank angle of a road can be obtained by calculating the height of left and right lane markers separately. These information is effective not only to raise the accuracy of solid object recognition but also to investigate for erroneous recognition.

In case where the object line j is a wide detection line jwide, the program goes from a step 27 to a step 28. The wide detection line jwide is a particular horizontal line established between the detection start line js and the detection end line je. At the step 28, a wide detection, that is, a lane detection over the entire area of the wide detection line jwide is performed.

Figure 18:
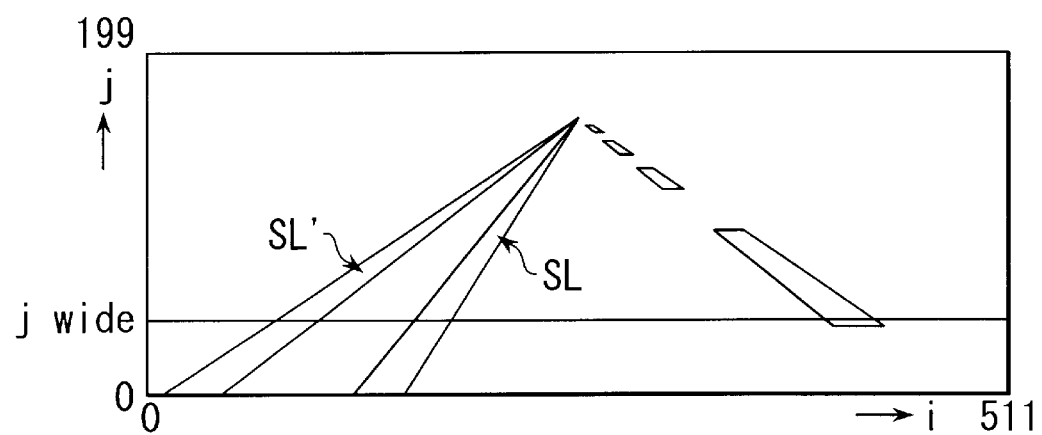
FIG. 18 is an explanatory view of a wide detection.

In the lane detection at the step 24, since the detection area R is established on the object line j for the reason of the detection accuracy and processing time, the lane detection is not performed outside of the detection area R. Accordingly, if the lane marker detected in a given horizontal line is right, a right lane marker is mostly detected in subsequent line. However, in case where a plurality of lane markers exist on one side of the road as shown in FIG. 18, there is a likelihood that a first lane marker is erroneously detected. For example, wherein a lane marker SL should have been detected, a lane marker SL' outside thereof is detected. In this case, there is a strong possibility that the same lane marker SL' is successively detected also in subsequent horizontal lines. Taking such situations into consideration, a wide detection is a process in which all candidates of lane markers SL, SL' on the wide detection line jwide are detected. In case where a plurality of lane candidates SL, SL' are detected at a step 28, flag information showing a presence of lane candidates and respective lane points Psl, Psl' are stored in RAM of the micro-computer 9. These information is used for evaluation of lane candidates at a later step 4.

At a step 29, a counter j is incremented, the object line shifting from a horizontal line j to a horizontal line j+1. Further, according to the judgment at a step 30, a foregoing steps 21 through 29 are carried out for every horizontal line. When a process of a horizontal line located in the uppermost position, that is, a process of a horizontal line j=199 finishes, this routine ends.

After the lane detection process at the step 2 finishes, at a step 3 "lane model" showing a three-dimensional (real space) position of lane marker is calculated. For that purpose, "lane points P" are read out from RAM in the micro-computer 9 and at the same time parallax data stored in the distance data memory 7 are read out.

The lane model is calculated as follows. First, a parallax d of a lane point P is identified from parallaxes of one frame. Further, coordinates (i, j, d) for all lane points P are obtained from respective lane points P (i, j) and parallaxes d.

A position (X, Y, Z) of left and right lane markers in real space is determined unconditionally according to the following formula:

$$Z = KZH/(d-DP)$$

$$X = r/2 + Z \cdot PW \cdot (i-IV)$$

$$Y = CH - Z \cdot PW \cdot (j-JV) \quad \text{[Formula 2]}$$

where KZH is a base length of camera/angle of horizontal visual field, DP is a parallax of a vanishing point, CH is installation height of stereoscopic camera, r is installation interval of stereoscopic camera, PW is an angle of view per one pixel, IV is i-coordinate of an infinite point on image in front of vehicle and JV is j-coordinate of the infinite point.

The coordinate system of image comprises an origin located at the left below corner, an i-axis extending in the horizontal direction and a j-axis extending in the vertical direction. Unit of coordinate axes is one pixel. On the other hand, the coordinate system of real space which is established on the basis of the position of an own vehicle, comprises an origin located on the road surface right underneath the center of the stereoscopic camera 1, a X-axis extending in the widthwise direction of the vehicle (defining right direction as positive), a Y-axis extending in the vertical direction of the vehicle (defining upward direction as positive) and a Z-axis extending in the longitudinal direction of the vehicle (defining forward direction as positive). Therefore, if a road on which the own vehicle is traveling is even, a X-Z plane (Y=0) agrees with a road surface of the road.

A lane model is calculated from thus calculated position (X, Y, Z) of the lane point P in real space. The lane model expresses the left and right lanes within a recognition range (distance from the camera position to a specified position) as a combination of plurality of broken lines each of which is a three-dimensional approximation line calculated per specified interval (segment) respectively. An example of the lane model is shown in FIG. 8.

The recognition range is divided into seven segments, letting a distance to the end point of respective intervals be Z1, Z2, Z3, Z4, Z5, Z6 and Z7 in a nearest order. Then, an approximation line is prepared by applying the least square method to lane points P within respective segments. Further, parameters a, b, c and d of approximation lines of segments are calculated with respect to left and right lane markers, respectively. The road surface is an area enclosed by left and right approximation lines L, R. This lane model also has a linear equation extending horizontally (X direction) or a horizontal configuration model and a linear equation extending vertically (Y direction) or a road height model, expressing road configurations such as gradients, unevenness of roads and the like.

(Horizontal configuration model)

Left lane marker: $X = a_L \cdot Z + b_L$

Right lane marker: $X = a_R \cdot Z + b_R$ (Road height model)

Left lane marker: $Y = C_R \cdot Z + d_L$

Right lane marker: $Y = C_R \cdot Z + d_R$ [Formula 3]

In the aforesaid example, a value of X (widthwise position of lane marker) is calculated based on the coordinate transformation formula shown in Formula 2. Otherwise, the widthwise position of lane marker can be calculated by projecting the lane point P(i, j) on the road surface (an area enclosed by left and right lane markers in the road height model). Thus, a lane model showing a three-dimensional configuration is calculated.

Figure 19:
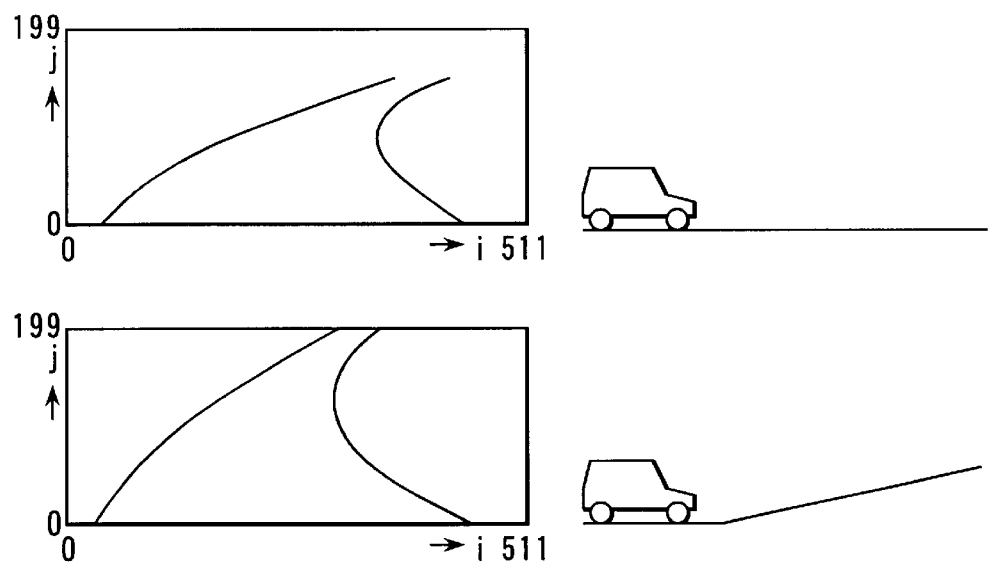
FIG. 19 is a diagram for explaining a relationship between the presence of an up-and-down and the configuration of a curve.

Since the unevenness condition of a road surface can not be judged according to a method of lane recognition using only brightness information, an accurate lane configuration in real space can not recognized. For example, as shown in FIG. 19, comparing two roads having the same curvature of radius, one road which is even differs from the other one which is uneven. As understood from the drawing, in case where there is an unevenness (in this case, the other road changes from even to upgrade on the way), the curvature of the road seems to have a small curvature (large radius). This has an adverse effect on the control of a warning device, automatic brake system and the like. On the other hand, according to the embodiment of the present invention, since both brightness and distance information is used, a three-dimensional position information concerning lane markers can be obtained. Thus obtained positional information enables to discriminate objects on the road (paint, manholes, patches and the like) from other obstacles else (man, vehicle, walls, buildings and the like) with accuracy.

At a step 4, the evaluation of candidates for lane marker is performed based on the result of the wide detection at a step 28. That is, in case where the object line is a wide detection line jwide and a plurality of objects supposed to be candidates for lane markers exist, respective candidates are evaluated. A time-versus histogram (accumulation of position data of lane markers obtained for each frame) is obtained with respect to the position of the candidates for lane markers detected (position on the horizontal line). At this time, the histogram is calculated being weighted by the position in which the candidates for lane markers are detected, as shown in FIG. 20.

Evaluation by Position on Horizontal Line
Establishment of Weight

Figure 20:
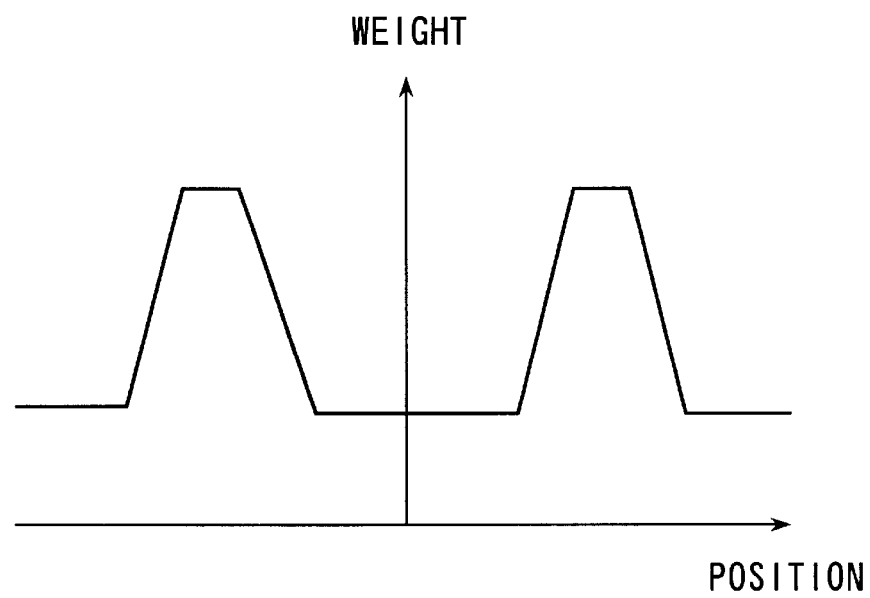
FIG. 20 is a diagram for explaining a weighing in accordance with the position in the process of evaluating lane candidates.

As shown in FIG. 20, weight is established according to the position on the horizontal line so as to become largest in a specified area on the left and right sides with respect to the center of the vehicle. This area corresponds to an area in which lane markers are included with high likelihood. Accordingly, there is a strong possibility that the candidates existing in that area are real lane markers.

Preparation of Histogram

The horizontal line being divided into a plurality of areas having a predetermined interval, the number of observations versus time is counted. In an area including lane markers, the value of the histogram corresponding to the area increases. In order to prevent the value from excessively increasing, an upper limit is provided. Further, in the other area including no lane markers, the value of the histogram corresponding to the other area decreases. The lower limit is 0.

In addition to the aforesaid method, weight may be varied according to vehicle speeds as follows.

Evaluation in Consideration of Vehicle Speeds
Establishment of Weight

Weight is established to be small at low speeds. At low speeds, objects other than lane marker (paint on the road surface and the like) are detected successively and the histogram is accumulated due to the objects. To reduce the increasing rate of histogram, a small weight is applied at low speeds. Further, in case where speeds are smaller than a certain value, the detection may be stopped. Further, weight is established to be large at high speeds. Specifically, weight is established so as to be able to detect a dotted line (passing lane marker) with 6 meters interval.

The candidates for lane markers are evaluated based on a histogram prepared according to the aforesaid method. A most probable candidate is referred to as a lane marker. Hereinafter, thus detected lane marker is corrected at a step 7.

At a step 5, the reliability of the lane marker (lane model) is calculated. As described above, the position of the lane marker in real space is expressed in the lane model. Since the lane model is used also for other purposes such as recognition of solid objects, miscellaneous controls (warning control) and the like, it is necessary that an index representing reliability, that is, a degree of reliability is expressed in figures. The lane model is not corrected by this degree of reliability. The degree of reliability is for giving an index of reliability to other processes for recognition using the lane model. The degree of reliability calculated this time is used for determining the size of the detection area R to be established next at the step 23.

The degree of reliability is calculated in consideration of the number of the lane points P detected and the continuity of the lane points P detected in the previous frame. That is, in case where the lane points P are detected successively, it is judged that the reliability is high. Then, the utility of the reliability can be enhanced further more by calculating the reliability of lane marker for every segment as shown in FIG. 8.

The reliability is calculated according to the following method for example. First, the degree of reliability D is calculated for each segment according to the presence or absence of data. The degree of reliability D calculated in the previous cycle for a given segment is incremented or decremented according to the number of sample points as the calculation base of the lane model for that segment. Thus, the present degree of reliability D is calculated. Accordingly, if the sample points are calculated successively within a certain segment, the degree of reliability D increases. To prevent an excessive increase, an upper limit is provided. On the other hand, in case where no sample points are detected, the degree of reliability D is decremented.

Further, the positional deviation between the previous lane model and the present lane model is obtained for every segment and the degree of reliability D is incremented or decremented according to the deviation amount. Accordingly, in case where the positional deviation occurs successively, the reliability goes down.

Further, at a step 6, the parallelization of left and right lane markers is evaluated. Normally, left and right lane markers are parallel wit each other. Therefore, otherwise, there is a strong likelihood that the lane makers are recognized erroneously. At the step 6, the parallelization of the left and right lane model is evaluated. Further, in case where some abnormality is found with respect to the parallelization, it is judged that those lane markers have been recognized erroneously and at a step 7 the present lane model is corrected. For example, in case where the interval of the left and right lane markers becomes larger (wider) as they goes far, either one is treated as abnormal. Such a case often happens when the lane is pronged. In this case, it is judged that a lane marker extending in the same direction as the vehicle traveling direction is a right one, correcting the abnormal one so as to run in parallel with the other one (step 7). Inversely, in case where the interval of the left and right lane markers becomes smaller (narrower) as they goes far, a lane marker with lower reliability is treated as erroneous recognition, the lane model being corrected (step 7).

Thus, the processes in the present frame finish through a series of steps (from step 1 to step 7).

As understood from descriptions mentioned above, according to the embodiment, not only brightness information of images but also distance information obtained from the stereo image processing is used for the recognition of lane markers. In case of the prior art employing a monocular camera, distance information (three-dimensional information) of lane markers can not be obtained. Hence, there is a possibility that objects (pillars of preceding vehicle, guard rails and the like) whose configuration resembles that of lane markers are recognized as real lane makers , although those objects are not on the road. On the other hand, in case of employing only distance information obtained from a stereoscopic camera, there is a possibility that objects (slip traces of tire, shadow, patches on the road surface and the like) whose configuration resembles that of lane markers but whose brightness differs from that of lane markers, are recognized as real lane markers because objects are located on the road. According to the present invention, since the recognition of lane markers is performed using both of distance and brightness information (including brightness data and brightness differential data), it is possible to obtain accurate lane information such as information with respect to the position of lane marker and height of lane marker. Accurate lane information ensures a high reliability in performing a surroundings monitoring control of a vehicle.

While the presently preferred embodiment of the present invention has been shown and described , it is to be understood that this disclosure is for the purpose of illustration and that various changes and modifications may be made without departing from the scope of the invention as set forth in the appended claims.

What is claimed is:

1. A lane recognition apparatus having an apparatus for recognizing lane markers on a road surface based on a pair of stereo images of a scene in front of an own vehicle obtained from a stereoscopic camera, comprising:
   a stereo image processing means for calculating a distance information of an image based on said pair of said images;
   a lane detecting means for detecting a lane marker of a lane in said image based on a brightness information of said image; and
   a lane position recognition means for recognizing a position of said lane of said lane marker in real space based on a position of said lane marker detected by said lane detecting means and said distance information calculated by said stereo image processing means.

2. The lane recognition apparatus according to claim 1, further comprising:
   a detection area establishing means for establishing a detection area for every horizontal line in said image.

3. A lane recognition apparatus for recognizing lane markers on a road surface based on a pair of stereo images of a scene in front of an own vehicle obtained from a stereoscopic camera, comprising:
   a stereo image processing means for calculating a distance information of an image based on said pair of said images;
   a lane detecting means for detecting a lane marker of a lane in said image based on a brightness information of said image and said distance information calculated by said stereo image processing means; and
   a lane position recognition means for recognizing a position of said lane marker in real space based on a position of said lane marker detected by said lane detecting means and said distance information calculated by said stereo image processing means.

4. The lane recognition apparatus according to claim 3, further comprising:
   a detection area establishing means for establishing a detection area for every horizontal line in said image.

5. A lane recognition apparatus having an apparatus for recognizing lane markers on a road surface based on a pair of stereo images of a scene in front of an own vehicle obtained from a stereoscopic camera, comprising:
   a stereo image processing means for calculating a distance information of an image based on said pair of said images;
   a lane detecting means for detecting a lane marker of a lane in said image based on a brightness information of said image;
   a lane position recognition means for recognizing a position of said lane of said lane marker in real space based on a position of said lane marker detected by said lane detecting means and said distance information calculated by said stereo image processing means; and
   a detection area establishing means for establishing a detection area for every horizontal line in said image,
   wherein said detection area establishing means has a first mode in which said detection area is established based on the result of detection of said lane marker in a previous image on a horizontal line as a detection object and a second mode in which said detection area is established based on the result of detection of said lane marker is a present image on a horizontal line as a detection object and said detection area is established on said horizontal line according to a mode selected from said first and second modes based on a detecting condition of said lane marker.

6. The lane recognition apparatus according to claim 5, wherein
said lane detecting means detects said lane marker within said detection area established by said detection area establishing means.

7. The lane recognition apparatus according to claim 6, wherein
said lane detecting means judges a position where a horizontal edge intensity is larger than a positive threshold value and a position where said horizontal edge intensity is smaller than a negative threshold value to be a boarder of road surface and lane marker, respectively.

8. The lane recognition apparatus according to claim 7, wherein
said lane detecting means judges an area having larger brightness than a brightness threshold value calculated based on a road surface brightness which is calculated from a brightness of a plurality of horizontal lines located in the vicinity of a horizontal line as a detection object.

9. The lane recognition apparatus according to claim 6, wherein
said lane detecting means judges a position of a boarder of a road surface and lane marker based on a first brightness threshold value and a second brightness threshold value larger than said first brightness threshold value, said first brightness threshold value is a threshold value for judging a boarder of road surface and lane marker and said second brightness threshold value is a threshold value for judging a brightness condition having larger brightness than a road surface in a searching area.

10. The lane recognition apparatus according to claim 5, further comprising:
an evaluation means for calculating a reliability of said lane marker detected in a previous image.

11. The lane recognition apparatus according to claim 9, wherein
said detection area establishing means changes a size of said detection area according to said reliability calculated by said detection area according to said reliability calculated by said evaluation means.

12. The lane recognition apparatus according to claim 10, wherein
said evaluation means evaluates said reliability of said lane marker based on the number of detected data and a continuity between a position of lane marker in present image and a position of lane marker in a previous image.

13. The lane recognition apparatus according to claim 5, further comprising:
a correcting means for evaluating a parallelization on left and right lane markers recognized by said lane position recognition means and for correcting said recognized position of said lane markers based on the result of said evaluated parallelization.

14. The lane recognition apparatus according to claim 13, further comprising;
a road height calculating means for calculating a height of road for every segment of road and a road height estimating means for estimating a height of road of all segments in a present image by correcting a height of road calculated in a previous image of all segments based on a deviation between a present height of road calculated in a specified segment on the near side of an own vehicle and a height of road calculated in a previous image.

15. The lane recognition apparatus according to claim 5, wherein
said lane detecting means detects all candidates of lane markers existing on at least one horizontal line in said image by detecting said lane marker in all areas of said horizontal line.

16. The lane recognition apparatus according to claim 5, wherein
said lane detecting means extracts said lane marker by applying a weight according to a detecting position on at least one horizontal line.

17. The lane recognition apparatus according to claim 16, wherein
said weight is changed according to a vehicle speed.

18. The lane recognition apparatus according to claim 5, wherein
said detection area establishing means makes a horizontal width of said detection area narrower as said detection area goes upward of said image.

19. The lane recognition apparatus according to claim 5, wherein
said detection area establishing means, in case where no lane marker can be detected in a horizontal line as a detection object, broadens said detection area in a horizontal line as a detection object, broadens said detection area in a horizontal line as a detection object.

20. A lane recognition apparatus for recognizing lane markers on a road surface based on a pair of stereo images of a scene in front of an own vehicle obtained from a stereoscopic camera, comprising:
a stereo image processing means for calculating a distance information of an image based on said pair of said images;
a lane detecting means for detecting a lane marker of a lane in said image based on a brightness information of said image and said distance information calculated by said stereo image processing means;
a lane position recognition means for recognizing a position of said lane marker in real space based on a position of said lane marker detected by said lane detecting means and said distance information calculated by said stereo image processing means; and
a detection area establishing means for establishing a detection area for every horizontal line in said image,
wherein said detection area establishing means has a first mode in which said detection area is established based on the result of detection of said lane marker in a previous image on a horizontal line as a detection object and said detection area is established on said horizontal line according to a mode selected from said first and second modes based on a detecting condition of said lane marker.

21. The lane recognition apparatus according to claim 20, wherein
said lane detecting means detects said lane marker within said detection area established by said detection area establishing means.

22. The lane recognition apparatus according to claim 21, wherein
said lane detecting means judges a position where a horizontal edge intensity is larger than a positive threshold value and a position where said horizontal edge intensity is smaller than a negative threshold value to be a boarder of road surface and lane marker, respectively.

23. The lane recognition apparatus according to claim 21, wherein
said lane detecting means judges an area having a larger brightness than a brightness threshold value calculated based on a road surface brightness which is calculated from a brightness of a plurality of horizontal lines located in the vicinity of a horizontal line as a detection object.

24. The lane recognition apparatus according to claim 21, wherein
said lane detecting means judges a position of a boarder of road surface and lane marker based on a first brightness threshold value and a second brightness threshold value larger than said first brightness threshold value for judging a boarder of road surface and lane marker and said second brightness threshold value, said first brightness threshold value is a threshold value for judging a boarder of value is a threshold value for judging a brightness condition having a larger brightness than a road surface in a searching area.

25. The lane recognition apparatus according to claim 20 further comprising:
an evaluation means for calculating a reliability of said lane marker detected in a previous image.

26. The lane recognition apparatus according to claim 25 wherein
said detection area establishing means changes a size of said detection area according to said reliability calculated by said evaluation means.

27. The lane recognition apparatus according to claim 25, wherein
said evaluation means evaluated said reliability of said lane marker based on the number of detected data and a continuity between a position of lane marker in a present image and a position for lane marker in a previous image.

28. The lane recognition apparatus according to claim 25, wherein
said evaluation means divides said lane marker into a plurality of segments and evaluates said reliability of said lane marker in respective segments.

29. The lane recognition apparatus according to claim 25, wherein
said evaluation means divides said lane marker into a plurality of segments and evaluates said reliability of said lane marker in respective segments.

30. The lane recognition apparatus according to claim 20, further comprising:
a correcting means for evaluating a parallelization of left and right lane markers recognized by said lane position recognition means and for correcting said recognized position of said lane markers based on the result of said evaluated parallelization.

31. The lane recognition apparatus according to claim 30, further comprising:
a road height calculating means for calculating a height of road for every segment of road and a road height estimating means for estimating a height of road of all segments in a present image by correcting a height of road calculated in a previous image of all segments based on a deviation between a present height of road calculated in a specified segment on the near side of a own vehicle and a height of road calculated in a previous image.

32. The lane recognition apparatus according to claim 20, wherein
said lane detecting means detects all candidates of lane markers existing on at least one horizontal line in said image by detecting said lane marker in all areas of said horizontal line.

33. The lane recognition apparatus according to claim 20, wherein
said lane detecting means extracts said lane marker by applying a weight according to a detecting position on at least one horizontal line.

34. The lane recognition apparatus according to claim 33, wherein
said weight is changed according to a vehicle speed.

35. The lane recognition apparatus according to claim 20, wherein
said detection area establishing means makes a horizontal width of said detection area narrower as said detection area goes upward of said image.

36. The lane recognition apparatus according to claim 20, wherein
said detection area establishing means, in case where no lane marker can be detected in a horizontal line as a detection object, broadens said detection area in a horizontal line as a detection object.

37. The lane recognition apparatus according to claim 20, wherein
said lane detecting means selects candidates of lane markers on a road surface based on said distance information calculated by said stereo image processing means and identifies a real lane marker from among said candidates of lane markers based on said brightness information of said image.

38. The lane recognition apparatus according to claim 20, wherein
said lane detecting means selects candidates of lane markers based on said brightness information of said image and identifies a real lane marker from among said candidates of lane markers based on said distance information calculated by said stereo image processing means.

39. A lane recognition apparatus having an apparatus for recognizing lane markers on a road surface based on a pair of stereo images of a scene in front of an own vehicle obtained from a stereoscopic camera, comprising:
a stereo image processing means for calculating a distance information of an image based on said pair of said images;
a lane detecting means for detecting a lane marker of a lane in said image based on a brightness information of said image;
a lane position recognition means for recognizing a position of said lane of said lane marker in real space based on a position of said lane marker detected by said lane detecting means and said distance information calculated by said stereo image processing means; and
a detection area establishing means for establishing a detection area for every horizontal line in said image, wherein said detection area establishing means calculates a gradient of said lane marker in an image plane based on said lane marker already detected and based on said calculated gradient, establishes said detection area in a horizontal line as a detection object.

40. A lane recognition apparatus for recognizing lane markers on a road surface based on a pair of stereo images of a scene in front of an own vehicle obtained from a stereoscopic camera, comprising:

a stereo image processing means for calculating a distance information of an image based on said pair of said images;

a lane detecting means for detecting a lane marker of a lane in said image based on a brightness information of said image and said distance information calculated by said stereo image processing means;

a lane position recognition means for recognizing a position of said lane marker in real space based on a position of said lane marker detected by said lane detecting means and said distance information calculated by said stereo image processing means; and wherein said detection area establishing means calculates a gradient of said lane marker in an image plane based on said lane marker already detected and based on said calculated gradient, establishes said detection area in a horizontal line as a detection object.

41. A solid object recognition apparatus having an apparatus for recognizing a solid object on a road surface based on a pair of stereo images with respect to an image obtained by imaging a scene in front of an own vehicle by a stereoscopic camera, comprising;

a stereo image processing means for calculating a distance information with respect to said image based on said pair of said stereo images;

a lane detecting means for detecting a lane marker in said image based on a brightness information of said image;

a road height calculating means for calculating a height of said lane marker in real space based on a position of said lane marker detected by said lane detecting means and a distance information calculated by said stereo image processing means; and a solid object judging means for judging an object projected in said image to be an solid object when said object exists above road surface recognized by said road height calculating means.

42. A vehicle behavior estimating apparatus having an apparatus for detecting a pitching of an own vehicle based on a pair of stereo images with respect to an image obtained by imaging a scene in front of an own vehicle by a stereoscopic camera, comprising:

a stereo image processing means for calculating a distance information with respect to said image based on said pair of said stereo images;

a lane detecting means for detecting a lane marker in said image based on a brightness information of said image;

a road height calculating means for calculating a height of road in real space based on a position of said lane marker detected by said lane detecting means and a distance information calculated by said stereo image processing means; and a pitching condition estimating means for estimating a pitching condition of an own vehicle based on a deviation between a height of road calculated by said road height calculating means and a height of road calculated in a previous image.

43. The vehicle behavior estimating apparatus according to claim 42, wherein said road height calculating means calculates said height of road for every successive segment and estimates said pitching condition based on a deviation between a height of road calculated in a specified segment on a near side of an own vehicle and a height of road calculated in a previous image.

44. A vehicle behavior estimating apparatus having an apparatus for estimating a bank angle of a road surface based on a pair of stereo images with respect to an image obtained by imaging a scene in front of an own vehicle by a stereoscopic camera, comprising:

a stereo image processing means for calculating a distance information with respect to said image based on said pair of said stereo images;

a lane detecting means for detecting a lane marker in said image based on a brightness information of said image;

a lane height calculating means for calculating a height of a left lane marker in real space and a height of a right lane marker in real space separately based on a position of said lane marker detected by said lane detecting means and said distance information calculated by said stereo image processing means; and a roll angle estimating means for estimating a roll angle of an own vehicle based on a deviation between said height of said left lane marker and said height of said right lane marker calculated by said lane height calculating means.

45. A road situation estimating apparatus having an apparatus for estimating a bank angle of a road surface based on a pair of stereo images with respect to an image obtained by imaging a scene in front of an own vehicle by a stereoscopic camera, comprising:

a stereo image processing means for calculating a distance information with respect to said image based on said pair of said stereo images;

a lane detecting means for detecting a lane marker in said image based on a brightness information of said image;

a lane height calculating means for calculating a height of a left lane marker in real space and height of a right lane marker in real space separately based on a position of said lane marker detected by said lane marker detecting means and said distance information calculated by said stereo image processing means; and a bank angle estimating means for estimating a bank angle of a road surface based on a deviation between said height of said left lane marker and said height of said right lane marker calculated by said lane height calculating means.

* * * * *